United States Patent Office 3,813,226
Patented May 28, 1974

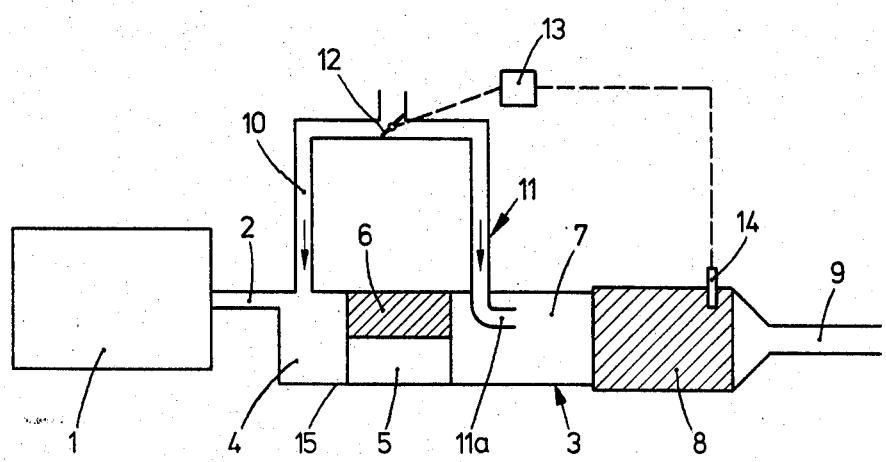

3,813,226
THERMO REGULATED CATALYTIC CLEANER FOR EXHAUST GAS
Herbert Heitland and Peter Manderscheid, Wolfsburg, Germany, assignors to Volkswagenwerk Aktiengesellschaft, Wolfsburg, Germany
Filed June 12, 1972, Ser. No. 262,005
Claims priority, application Germany, June 11, 1971, P 21 28 989.4
Int. Cl. B01j 9/04; F01n 3/14
U.S. Cl. 23—288 F                                   6 Claims

ABSTRACT OF THE DISCLOSURE

Arrangement for cleaning exhaust gas comprising, an input conduit for coupling the cleaning arrangement to the combustion engine and passing the exhaust gas from the engine to the cleaning arrangement which includes in the flow direction of the exhaust gas an ante-chamber in which the input conduit terminates, a thermal reactor for oxidation of the exhaust gas placed downstream with respect to the flow of exhaust gas coming from the input conduit, a first catalysator for the reduction of the components of the exhaust gas and placed parallel with the thermal reactor with respect to the direction of flow of the exhaust gas, a second chamber following adjacent the first catalysator and thermal reactor in the downstream direction, a second catalysator operating at high temperatures and following the second ante-chamber in the downstream direction and having an output emitting the exhaust gas in cleaned condition to the atmosphere, a source of secondary or control air having a first input conduit and a second input conduit, a device selectively controlling the flow of the secondary air to the first input conduit and to the second input conduit, the first input conduit being coupled to the ante-chamber at a region such that when the secondary air is flowing therethrough the secondary air diverting flow of the exhaust gas to the thermal reactor placed offset with respect to the location of the exhaust gas input conduit the exhaust gas flows to the first catalysator substantially lying in the input direction of the exhaust gas when the first input conduit is closed by the selectively controlling device, a sensor for sensing the temperature of the second catalysator and when a predetermined operating temperature is sensed producing a signal causing operating device of the controlling means for diverting the secondary air flow to the second input conduit and thereby causing an acceleration of the air through the first catalysator to the second catalysator.

CROSS REFERENCE TO OTHER APPLICATIONS

Reference should be had to the copending application of Herbert Heitland entitled "Converter for Catalythic Exhaust Gas Cleaning" Ser. No. 262,004, filed June 12, 1972, and of the application of Herbert Heitland and Peter Manderscheid entitled "Arrangement for Exhaust Gas Cleaning," Ser. No. 262,008 filed June 12, 1972, both having been assigned to the same assignee as the present application.

FIELD OF THE INVENTION

The present invention relates to an exhaust gas cleaning arrangement for motor vehicles having a thermal reactor supplied with a first secondary air for oxidation purposes and a first catalyst or catalysator for reduction of the constituents of the exhaust gas.

BACKGROUND OF THE INVENTION

An arrangement of the above described type has been disclosed by German laid-open application 1,921,024.

Inasmuch as thermal reactors for the oxidation of the exhaust gas components such as carbon monoxide and hydrocarbon require a firing arrangement, consequently, a fuel supply, there is a general interest to shift to catalysators also for the oxidation of the constituents in the exhaust gases. Difficulties are encountered in that the available catalysators materials attain their full efficiency of operation only at high temperatures which at the starting of the engine producing the exhaust gas or at its smaller loading are not available.

SUMMARY OF THE INVENTION

It is, therefore, an object of the present invention to provide an exhaust cleaning arrangement for motor vehicles which represents a favorable compromise between the above mentioned considerations, namely the requirement for a good efficiency of the arrangement in cleaning the exhaust gas and, at the same time, requiring a low additional energy input.

According to the present invention the thermal reactor and the first catalysator are placed in parallel with respect to the flow of the exhaust gas and at their output are coupled with a second catalyst or having a secondary air supply for the oxidation of the components in the exhaust gas and which becomes fully efficient only after it became heated up and it is provided with a temperature sensor for turning off the first secondary air input and for turning on the second secondary air input after the heating up has taken place and wherein the exhaust gas input conduit from the engine and the first secondary air supply input conduit are coupled in a first ante-chamber upstream with respect to the thermal reactor and the first catalysator in such a fashion that the first secondary air input has a valve-like effect by guiding the exhaust gas during its insertion to the thermal reactor while after it has been turned off it will lead the exhaust gas to the first catalysator.

The invention is based on the consideration that at the starting up of the combustion engine or during the operation of the engine at small loads, there are only small amounts of nitrogen oxide present in the exhaust gas which should be reduced in the first catalysator. It can be also assumed that at such operational stages of the combustion engine the exhaust gas can be bypassed around the first catalysator and led through the thermal reactor which will take care of the oxidation of the large components of carbon monoxide and hydrocarbons present in the exhaust gas at the starting up stage. This thermal reactor is operational only during that time which is required for the bringing up the second catalysator to its full operational temperature. As soon as the second catalysator which is used also for the oxidation of the hydrocarbons and carbon monoxide in the exhaust gas reaches its operational temperature a turning off of the thermal reactor and a turning on of the first catalysator takes place by switching the secondary air input from its first to its second input so that now a reduction as well as an oxidation of the different exhaust gas components can take place catalytically. It is quite an advantage that according to the present invention there is no need for a mechanical valve since the exhaust gas is guided first to the thermal reactor then through the first catalysator by the first secondary air input. As a further aspect of the present invention the second secondary air input is constructed to provide an ejector effect on the exhaust gas passing through the first catalysator and, therefore, it is placed downstream with respect to it. In such embodiment of the present invention the second secondary air input is also used for guiding the exhaust gas.

More particularly this can be done in a manner that the second secondary air input terminates in a second ante-chamber placed on one hand between the first catalysator and thermal reactor and, on the other hand, between the second catalysator. As a result the second secondary air input protrudes into the second ante-chamber in the form of an elbow-like tube directed in the direction of the exhaust gas flow. The free end of the tube may be aligned with the output of the first catalysator so that it does not lie at the height of the output of the thermal reactor which at the turning on of the second secondary air input must be set out of operation.

While in the just described embodiment of the present invention the second secondary air input is used as an ejector, the first secondary air input has a valve-like effect, more particularly in the form of a switching valve, which guides the exhaust gas selectively to the thermal reactor or to the first catalysator.

According to the preferred embodiment of the present invention the input conduit of the exhaust gas from the engine is aligned with the first catalysator while it is offset with respect to the thermal reactor and the first secondary air input directed in the direction of such offset terminates in the first ante-chamber. For using the first secondary air input as a switching valve there are many possibilities available for a constructor. One may also use several fluidic principles in constructing the control air inputs.

BRIEF DESCRIPTION OF THE DRAWING

The invention will become more readily apparent from the following description of a preferred embodiment thereof shown, by way of example, in the accompanying drawing in which:

The single figure is the schematic diagram of the exhaust gas cleaning arrangement according to the present invention in a motor vehicle.

DESCRIPTION OF THE PREFERRED EMBODIMENT

With reference to the single figure it is seen that the schematically identified combustion engine 1, the exhaust gas of which should undergo cleaning, has its exhaust gas passed through a conduit 2 to the cleaning arrangement 3 for the cleaning purposes. As seen in the illustrated embodiment the exhaust gas from conduit 2 reaches a first ante-chamber 4 which when considering the flow of the exhaust gas is placed before a thermal reactor 5 offset with respect to input 2 and a thermal catalysator 6 aligned with input 2. The thermal reactor 5 serves for the oxidation while the first catalysator 6 serves for the reduction of the components in the exhaust gas. At the output of the thermal reactor 5 and of the first catalysator 6 a second ante-chamber 7 is joined which is ahead in the process of a second catalysator 8 which also serves for the oxidation of the components in the exhaust gas. The second catalysator 8 is characterized by the properties that its full oxidizing efficiency is reached only at high temperatures, that is, not during the start-up phase or at small loads of the combustion engine 1. The clean exhaust gas leaves the arrangement 3 at the tail pipe 9.

It has been found that at the start-up phase of the combustion engine 9 the exhaust gas has a high concentration of carbon monoxide and hydrocarbons, therefore, the exhaust gas during this operational state as well as at small loads of the combustion engine 1 must be passed through the thermal reactor 5 for oxidation. Otherwise during these operational stages of the combustion engine 1 the exhaust gas can bypass the first catalysator 6 since nitrous oxide is present in the gas only in small amounts for the reduction of which the catalysator 6 serves. According to the present invention a first secondary or control air input 10 and the second secondary or control air input 11 are used with consideration of the temperature of the second catalysator 8, to selectively switch and guide the exhaust gas coming in through conduit 2 and to pass it to the thermal reactor 5 bypassing the first catalysator 6 or passing it through the first catalysator 6 bypassing the thermal reactor 5. Both secondary air inputs 10 and 11 are selectively switched into the illustrated gas circuit by means of a switching valve illustrated as a butterfly valve 12. This switching valve 12 has an operating device 13 which is controlled as a function of the temperature sensed by a temperature sensor 14 placed on the second catalysator 8. In the illustrated position of the butterfly valve it is assumed that the combustion engine 1 has just started up and, therefore, the temperature of the second catalysator 8 is still below its operating temperature. Consequently, it is necessary that the exhaust gases be passed through the thermal reactor 5. According to the illustrated embodiment of the present invention the stream of the exhaust gas is guided without the use of a mechanical valve which would be susceptible to corrosion and such guidance is performed only by the passing of the secondary air flow to the first input 10. To this effect the first catalysator 6 is aligned with respect to the exhaust gas input conduit 2 while the thermal reactor 5 is offset with respect to conduit 2. The first secondary air input 10 is arranged with respect to the components adjoining the ante-chamber 4 so that when it is under operation, that is, when the secondary air stream is passing through it, it is capable of forcing the exhaust gas coming through conduit 2 to the input of the thermal reactor 5. As a result, it is assured that during the start-up phase of the combustion engine 1 or in general at low temperatures of the second catalysator 8, the exhaust gas which is rich with carbon monoxide and hydrocarbons is passed through the reactor 5.

As soon as the second catalysator 8 is brought up to its operating temperature by the hot exhaust gases passing therethrough, the temperature sensor 14 delivers to the operating device 13 a signal causing the switching over of the butterfly valve 12 in a position which is not shown in the drawing and in which the butterfly valve 12 will shut the first secondary input 10 and opens up the second secondary air input 11. As a result, the exhaust gas coming through the conduit 2 will not be forced away to reactor 5 since there is no secondary air flow through conduit 10 and, therefore, it can go into the aligned first catalysator 6. In order to aid the flow of the exhaust gas into such direction the second secondary air input as indicated at 11a has an elbow-like deflection directed in the direction of the exhaust gas flow so that such elbow-like deflection of the secondary tube 11 has an ejector-like effect on the exhaust gas coming through the first catalysator 6.

It is noted that the construction of the thermal reactors and the catalysators as well as the temperature sensors is not the subject matter of the present application but reference may be had to the above-mentioned applications, for example.

The entire cleaning arrangement 3 is placed in a common housing 15 and it has a compact appearance. The thermal reactor 5 and the first catalysator 6 are placed directly adjacent to each other so that the first catalysator 6 acts as a heat insulation for the thermal reactor 5 on one hand, and on the other hand, it becomes quickly heated up by the thermal reactor 5 so that it can also quickly reach its operating temperature.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A combustion engine producing an exhaust gas in combination with a cleaning arrangement for cleaning said exhaust gas, an input conduit coupling said cleaning arrangement to the combustion engine and passing the exhaust gas from said engine to said cleaning arrangement said cleaning arrangement comprising in the flow direction of said exhaust gas an ante-chamber into which said input conduit terminates, a thermal reactor for oxidation of the exhaust gas placed downstream with respect to the flow of exhaust gas coming from said input conduit, a first catalysator for the reduction of the components of the exhaust gas and placed parallel with said thermal reactor with respect to the direction of flow of said exhaust gas, a second chamber following adjacent said first catalysator and thermal reactor in the downstream direction of said exhaust gas, a second catalysator operating at high temperatures and following said second ante-chamber in the downstream direction and having an output emitting said exhaust gas in cleaned condition to the atmosphere, a source of secondary or control air having a first input conduit and a second input conduit, means for selectively controlling the flow of said secondary air to said first input conduit and said second input conduit, said first input conduit being coupled to said ante-chamber at a region such that when said secondary air is flowing therethrough said secondary air diverting flow of said exhaust gas to said thermal reactor placed offset with respect to the location of said exhaust gas input conduit, said exhaust gas flowing to said first catalysator substantially lying in the input direction of said exhaust gas when said first input conduit is closed by said selectively controlling means, said controlling means including an operating device, a sensor means for sensing the temperature of said second catalysator and when a predetermined operating temperature is sensed producing a signal causing said operating device to operate said controlling means for diverting said secondary air flow to said second input conduit and thereby causing an acceleration of the air through said first catalysator to said second catalysator.

2. The combination as claimed in claim 1, wherein said first catalysator is substantially aligned with the input flow of said exhaust gas to said first ante-chamber, said thermal reactor lying offset with respect to said input flow of said exhaust gas, said first input conduit of said secondary air being directed in the direction of said offset thermal reactor.

3. The combination as claimed in claim 1, wherein said second input of said control air is formed to provide an ejector effect on said exhaust gas coming through said first catalysator and being directed downstream with respect to said first catalysator.

4. The combination as claimed in claim 3, wherein said second input of said control air is formed in said second ante-chamber as an elbow having an open end pointing in the downstream direction of said exhaust gas.

5. The combination as claimed in claim 4, wherein said free end of said elbow is substantially aligned with the output of said first catalysator.

6. The combination as claimed in claim 1, wherein said first ante-chamber, said first and second catalysators, said thermal reactor and said second ante-chamber are placed in a common housing.

References Cited
UNITED STATES PATENTS

| | | | |
|---|---|---|---|
| 3,662,540 | 5/1972 | Murphey | 60—274 |
| 3,144,309 | 8/1964 | Sparrow | 60—288 X |

JAMES H. TAYMAN, Jr., Primary Examiner

U.S. Cl. X.R.

423—213.7; 60—299, 287, 299, 301